United States Patent
Malmborg et al.

(10) Patent No.: US 11,033,993 B2
(45) Date of Patent: Jun. 15, 2021

(54) METHOD OF FORMING GAS TURBINE ENGINE COMPONENTS

(71) Applicant: United Technologies Corporation, Farmington, CT (US)

(72) Inventors: Eric W. Malmborg, Amston, CT (US); Thomas H. Rogers, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 167 days.

(21) Appl. No.: 16/358,880

(22) Filed: Mar. 20, 2019

(65) Prior Publication Data

US 2020/0298352 A1  Sep. 24, 2020

(51) Int. Cl.
    *B23P 15/04*      (2006.01)
    *F01D 5/14*      (2006.01)
    *B23K 101/00*      (2006.01)

(52) U.S. Cl.
CPC .............. *B23P 15/04* (2013.01); *F01D 5/147* (2013.01); *B23K 2101/001* (2018.08); *F05D 2220/32* (2013.01); *F05D 2220/36* (2013.01); *F05D 2230/232* (2013.01); *F05D 2240/301* (2013.01)

(58) Field of Classification Search
CPC ...... B23P 15/04; F01D 5/147; F05D 2220/36; F05D 2230/232; F05D 2240/301; B23K 2101/001
See application file for complete search history.

(56) References Cited

U.S. PATENT DOCUMENTS

| | | | |
|---|---|---|---|
| 4,188,811 A | 2/1980 | Brimm | |
| 5,063,662 A | 11/1991 | Porter et al. | |
| 5,072,871 A * | 12/1991 | Moracz | B23K 20/00 228/193 |
| 5,269,058 A | 12/1993 | Wiggs et al. | |
| 7,237,709 B2 | 7/2007 | Beckford | |
| 7,296,977 B2 | 11/2007 | Bonnet | |
| 7,322,223 B2 | 1/2008 | Levers | |
| 7,993,105 B2 | 8/2011 | Weisse et al. | |

(Continued)

FOREIGN PATENT DOCUMENTS

| | | |
|---|---|---|
| DE | 102011076082 | 11/2012 |
| EP | 2239083 | 10/2010 |

(Continued)

OTHER PUBLICATIONS

European Search Report for European Patent Application No. 20163545.5 completed May 29, 2020.

*Primary Examiner* — Lee A Holly
(74) *Attorney, Agent, or Firm* — Carlson, Gaskey & Olds, P.C.

(57) ABSTRACT

A method of forming a gas turbine engine component according to an example of the present disclosure includes, among other things, forming a plurality of internal channels in a main body between one or more internal ribs, and forming a weld pattern in an external surface of a cover skin. The weld pattern is based on at least a geometry of the one or more internal ribs. The method includes positioning the cover skin along the main body to enclose the plurality of internal channels, and welding the cover skin to the main body along the weld pattern subsequent to the positioning step.

21 Claims, 9 Drawing Sheets

(56) References Cited

U.S. PATENT DOCUMENTS

| | | |
|---|---|---|
| 8,205,476 B2 | 6/2012 | Voice |
| 8,256,118 B2 | 9/2012 | Cammer |
| 9,010,166 B2 | 4/2015 | Brennand |
| 9,121,287 B2 | 9/2015 | Weisse et al. |
| 9,556,742 B2 | 1/2017 | Parkin et al. |
| 9,790,800 B2 | 10/2017 | Quigley |
| 2010/0068550 A1* | 3/2010 | Watson ................ B23K 33/004 428/586 |
| 2010/0247322 A1* | 9/2010 | Bochiechio .......... B23K 20/129 416/233 |
| 2014/0271227 A1 | 9/2014 | Radomski et al. |
| 2016/0003061 A1* | 1/2016 | McComb ................... F02C 3/04 60/805 |
| 2018/0318966 A1 | 11/2018 | Evans et al. |
| 2019/0040744 A1* | 2/2019 | Bales .................. B23K 1/0018 |

FOREIGN PATENT DOCUMENTS

| | | |
|---|---|---|
| EP | 2243929 | 10/2010 |
| EP | 3385026 | 10/2018 |
| EP | 3441573 | 2/2019 |
| GB | 2073631 | 10/1981 |

\* cited by examiner

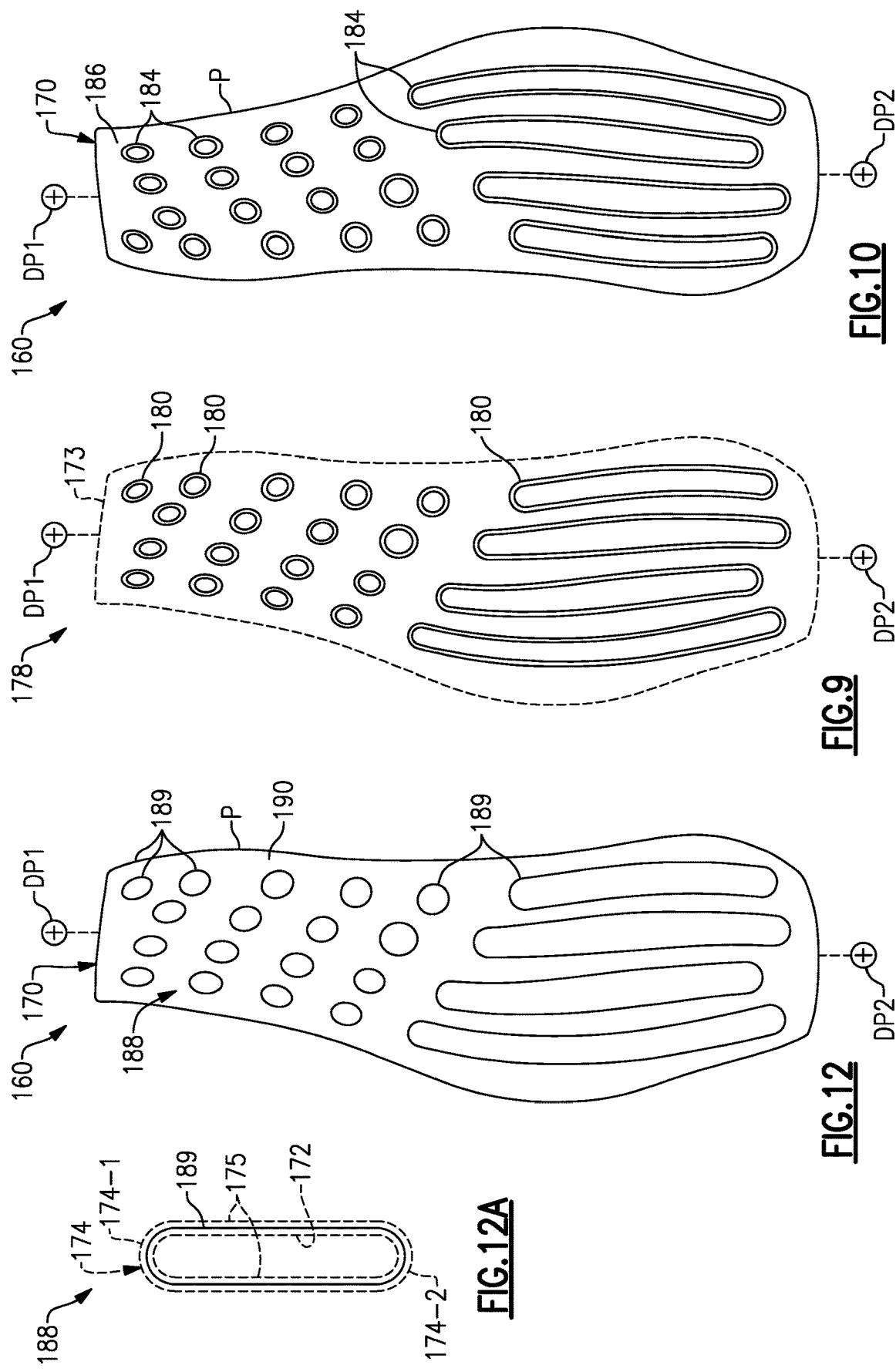

METHOD OF FORMING GAS TURBINE ENGINE COMPONENTS

BACKGROUND

This disclosure relates to a gas turbine engine, and more particularly to forming gas turbine engine components including attaching internal features.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

Some fans include hollow fan blades made of a metallic or composite material. Various techniques can be utilized to construct hollow fan blades, including attaching a cover skin to an airfoil body.

SUMMARY

A method of forming a gas turbine engine component according to an example of the present disclosure includes forming a plurality of internal channels in a main body between one or more internal ribs, and forming a weld pattern in an external surface of a cover skin. The weld pattern is based on at least a geometry of the one or more internal ribs. The method includes positioning the cover skin along the main body to enclose the plurality of internal channels, and welding the cover skin to the main body along the weld pattern subsequent to the positioning step.

In a further embodiment of any of the foregoing embodiments, the cover skin and the main body are metallic.

In a further embodiment of any of the foregoing embodiments, the main body and the external surface of the cover skin cooperate to define pressure and suction sides of an airfoil.

In a further embodiment of any of the foregoing embodiments, the airfoil is a fan blade.

In a further embodiment of any of the foregoing embodiments, the one or more internal ribs are a plurality of internal ribs that are spaced apart along a wall of the main body.

In a further embodiment of any of the foregoing embodiments, the weld pattern comprises a plurality of separate and distinct sub-patterns. Each of the sub-patterns correspond to a respective one of the plurality of internal ribs.

In a further embodiment of any of the foregoing embodiments, each sub-pattern corresponds to a mean line defined between opposing sidewalls of a respective one of the plurality of internal ribs.

In a further embodiment of any of the foregoing embodiments, each of the internal ribs has a first arcuate portion and a second arcuate portion opposed to the first arcuate portion such that the respective one of the internal ribs encircles a respective one of the plurality of internal channels.

A further embodiment of any of the foregoing embodiments includes inspecting the one or more internal ribs to define the weld pattern.

In a further embodiment of any of the foregoing embodiments, the inspecting step includes determining a set of edge curves corresponding to the geometry of the one or more internal ribs, and the weld pattern corresponds to the set of edge curves.

A further embodiment of any of the foregoing embodiments includes forming a recess in the main body that extends about the one or more internal ribs and that is dimensioned to mate with a perimeter of the cover skin. The weld pattern is based on a geometry of the recess. The welding step includes welding the perimeter of the cover skin to surfaces of the recess along the weld pattern.

A further embodiment of any of the foregoing embodiments includes deforming the cover skin with respect to a predefined contour subsequent to the step of forming the weld pattern. The cover skin has a substantially planar geometry during the step of forming the weld pattern.

In a further embodiment of any of the foregoing embodiments, the main body extends from a root section to a tip portion, and the step of deforming the cover skin occurs such that the tip portion defines a stagger angle relative to the root section, and the stagger angle is greater than or equal to 10 degrees, absolute.

A further embodiment of any of the foregoing embodiments includes forming one or more pedestals in an internal surface of the cover skin, and positioning the one or more pedestals in abutment against respective ones of the one or more internal ribs. The welding step includes welding the one or more internal ribs to respective ones of the one or more pedestals along the weld pattern.

A method of forming a gas turbine engine component according to an example of the present disclosure includes forming a plurality of internal channels in a main body between a plurality of internal ribs, inspecting the main body to determine a rib pattern subsequent to forming the plurality of internal channels, the rib pattern corresponding to a geometry of the plurality of internal ribs, forming a plurality of pedestals in an internal surface of a cover skin according to the rib pattern, positioning the cover skin along the main body to enclose the plurality of internal channels such that the plurality of pedestals abut against respective ones of the plurality of internal ribs, and welding the plurality of pedestals to respective ones of the plurality of internal ribs subsequent to the positioning step.

In a further embodiment of any of the foregoing embodiments, the cover skin and the main body are metallic.

In a further embodiment of any of the foregoing embodiments, the inspecting step includes determining a set of edge curves corresponding to sidewalls of the plurality of internal ribs, and the rib pattern corresponds to the set of edge curves.

A further embodiment of any of the foregoing embodiments includes forming a weld pattern in an external surface of the cover skin, the weld pattern based on at least a geometry of the plurality of internal ribs, and welding the cover skin to the main body along the weld pattern subsequent to the positioning step.

In a further embodiment of any of the foregoing embodiments, the weld pattern is offset from the rib pattern.

A further embodiment of any of the foregoing embodiments includes deforming the cover skin with respect to a predefined contour subsequent to the step of forming the plurality of pedestals, the cover skin having a substantially planar geometry during the inspecting step, and forming a recess in the main body that is dimensioned to mate with a perimeter of the cover skin. The cover skin has a substantially planar geometry during the step of forming the plurality of pedestals. The welding step includes welding a perimeter of the cover skin to the main body along the weld pattern subsequent to the positioning step.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 9 illustrates an example rib pattern.

FIG. 10 illustrates a first skin in a first condition including surfaces features.

FIG. 12 illustrates an example weld pattern.

FIG. 12A illustrates selected portions of the weld pattern of FIG. 11.

DETAILED DESCRIPTION

Figure 1:
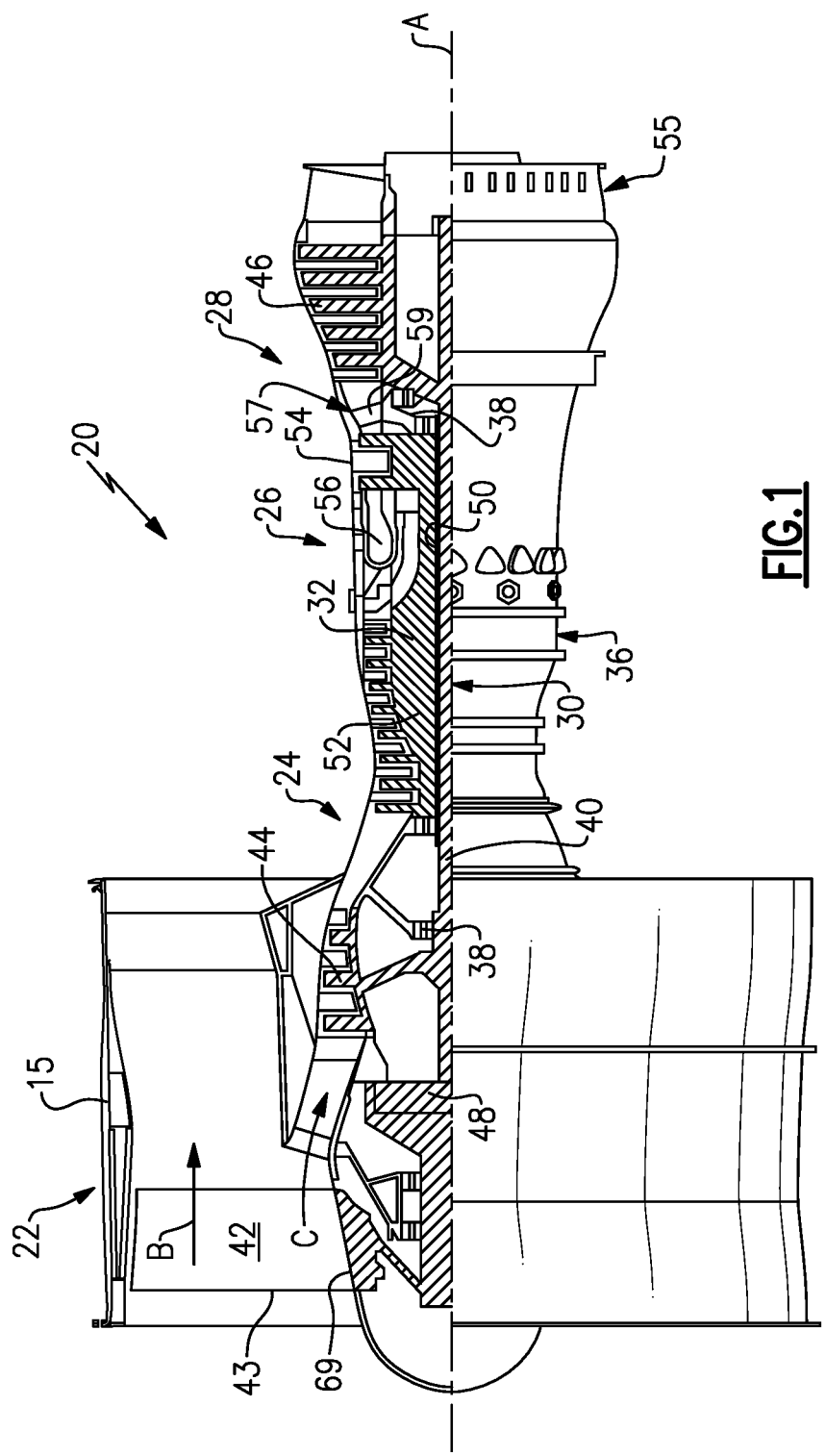
FIG. 1 illustrates an example turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]$^{0.5}$. The "Low corrected fan tip speed" as disclosed herein according to one non-limiting embodiment is less than about 1150 ft/second (350.5 meters/second).

Figure 2:
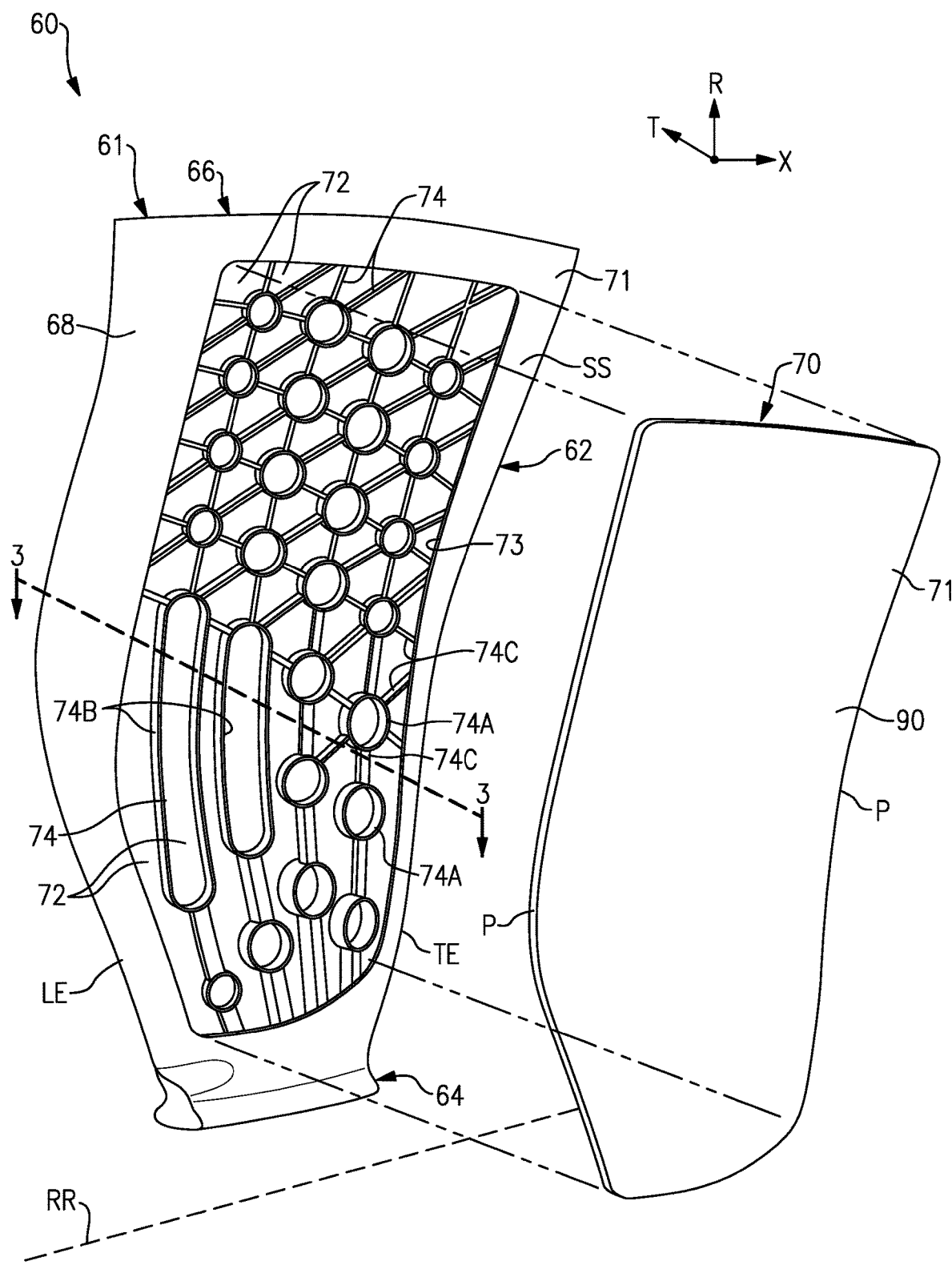
FIG. 2 illustrates an exploded, perspective view of a gas turbine engine component including a first skin in an uninstalled position.
Figure 3:
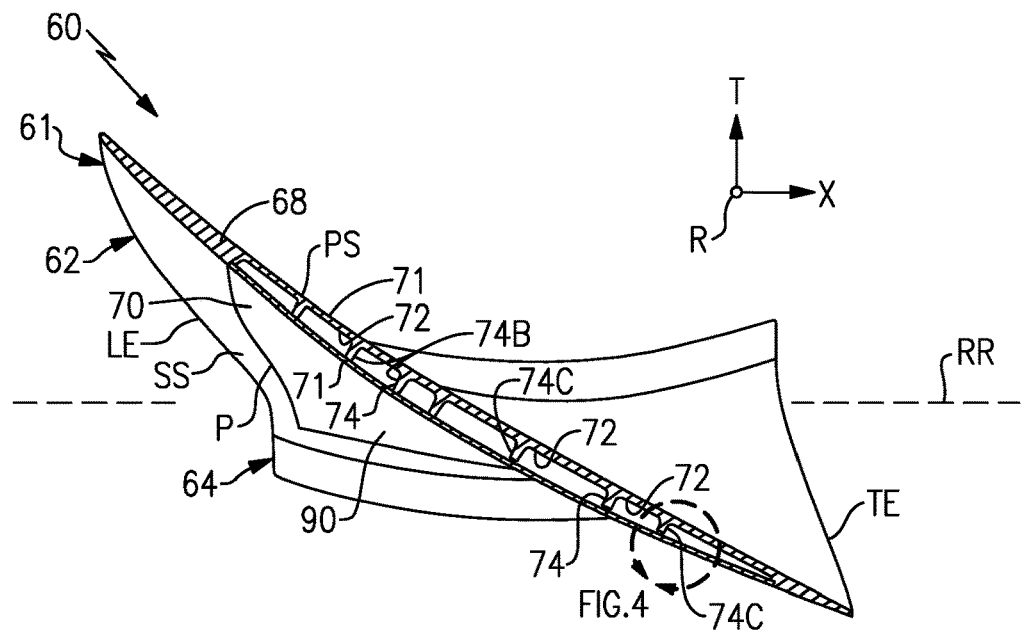
FIG. 3 illustrates a section view of the component taken along line 3-3 of FIG. 2 with the first skin in an installed position.

FIGS. 2-3 illustrate a gas turbine engine component 60 according to an example. The component 60 can be incorporated in the engine 20 of FIG. 1, for example. In the illustrated example of FIGS. 2-3, the component 60 is an airfoil 61. The airfoil 61 can be a fan blade 43 for the fan 42 of FIG. 1, for example. Other types of airfoils, including blades, vanes and struts in the fan, compressor and turbine sections 22, 24, 28, mid-turbine frame 57, and turbine exhaust case (TEC) 55 (FIG. 1) may benefit from the examples disclosed herein which are not limited to the design shown. Other portions of the engine 20 including engine cases, and other systems such as industrial turbines may benefit from the examples disclosed herein.

The airfoil 61 includes an airfoil section 62 extending in a spanwise or radial direction R from a root section 64 to a tip portion 66 (FIG. 3). The root section 64 is a shape that is configured to mount the fan blade 43 in the engine 20, such as a dovetail shape. The tip portion 66 is a terminal end of the airfoil 61. Generally, one side of the airfoil section 62 is a suction side SS and the other side is a pressure side PS (FIG. 3) separated in a thickness direction T. The pressure side PS has a generally concave profile, and the suction side SS has a generally convex profile. The airfoil section 62 extends in the thickness direction T between the pressure and suction sides PS, SS to define an aerodynamic surface contour of the airfoil section 62, as illustrated in FIG. 3. The airfoil 61 is rotatable about an axis of rotation RR. The axis of rotation RR can be collinear or parallel to the engine axis A of the engine 20.

The airfoil section 62 includes a main (or airfoil) body 68 that extends in the radial direction R from the root section 64 to the tip portion 66 (FIG. 3). The main body 68 extends in a chordwise direction X between a leading edge LE and a trailing edge TE. The main body 68 defines at least one of the pressure and suction sides PS, SS. In the illustrated example of FIGS. 2 and 3, the main body 68 defines both the pressure and suction sides PS, SS.

The airfoil 61 includes a cover (or first) skin 70 disposed on a surface of the main body 68 and is arranged to provide a continuous surface with the suction side SS of the airfoil 61 when in an installed position, as illustrated by FIG. 3. In another example, the cover skin 70 is disposed on the pressure side PS of the airfoil 61. The cover skin 70 is shown in an uninstalled position in FIG. 2 for illustrative purposes. The component 60 can include two or more cover skins along each of the pressure and/or suction sides PS, SS of the airfoil section 62.

The main body 68 and cover skin 70 can be made out of metallic materials such as titanium or aluminum. Other materials can be utilized, including metal alloys and metal matrix composites.

The airfoil 61 includes at least one internal cavity or channel 72 defined in the airfoil section 62. The main body 68 includes at least one internal rib 74 that defines one or more internal channels 72. In the illustrative example of FIGS. 2-3, the airfoil 61 includes a plurality of internal ribs 74 extending outwardly from a wall of the main body 68. The internal ribs 74 define a plurality of internal channels 72 in the main body 68 between respective ones of the internal ribs 74. Each internal channel 72 and internal rib 74 can have different dimensions, shapes and/or orientations than illustrated by FIGS. 2-3. The internal cavities 72 can substantially or completely free of any material such that the airfoil section 62 is hollow in an assembled condition.

Figure 4:
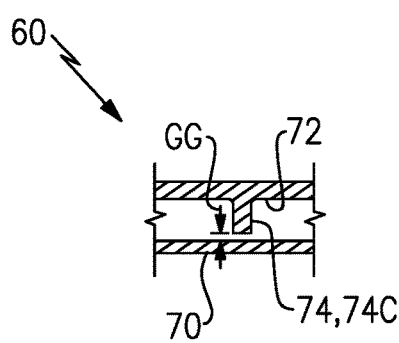
FIG. 4 illustrates selected portions of the component of FIG. 3.

At least some of the internal ribs 74 can differ in geometry, as illustrated by ribs 74A, 74B, 74C of FIG. 2. In the illustrative example of FIG. 2, internal ribs 74A have a generally circular or elliptical geometry, ribs 74B have a generally oblong or racetrack shaped geometry, and ribs 74C are generally linear or curvilinear. Ribs 74A, 74B can be attached to the cover skin 70 utilizing any of the techniques disclosed herein, including laser or electron beam welding, brazing, diffusion bonding or other fastening techniques. At least some of the internal ribs 74 can be spaced apart from the cover skin 70 to define a gap GG when in an assembled position, as illustrated by rib 74C of FIG. 4. Ribs 74C can be dimensioned to provide rigidity to the main body 68.

Walls 71 of the component 60 bound the internal cavities 72. The walls 71 can be internal or external walls of the component 60. The main body 68 and cover skin 70 define one or more of the walls 71. One or more internal ribs 74 are spaced apart along the wall 71 of the main body 68, as illustrated by ribs 74A, 74B in FIG. 2. The cover skin 70 is attached to the main body 68 to enclose or otherwise bound the internal cavities 72, with the main body 68 and an external surface 90 of the cover skin 70 cooperating to define the pressure and suction sides PS, SS of the airfoil section 62 in an assembled position. The main body 68 can define a shelf or recess 73 surrounding or otherwise extending about the internal channels 72 and internal ribs 74. The recess 73 is dimensioned to at least partially receive and mate with a perimeter P of the cover skin 70 to enclose or otherwise bound the internal cavities 72, as illustrated by FIG. 3.

Figure 5:
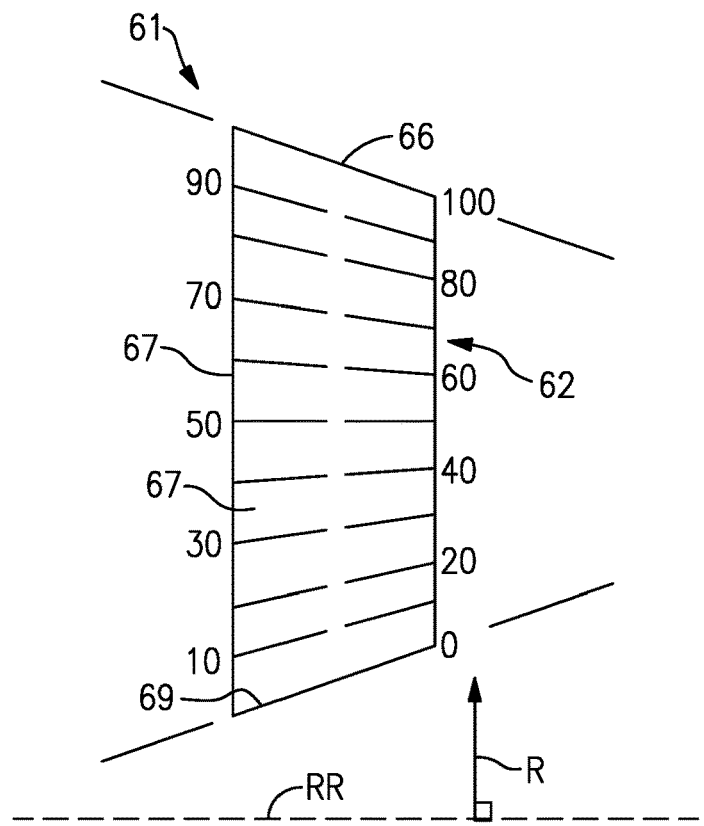
FIG. 5 is a schematic view of airfoil span positions.

Referring to FIG. 5, span positions of the airfoil section 62 are schematically illustrated from 0% to 100% in 10% increments to define a plurality of sections 67. Each section 67 at a given span position is provided by a conical cut that corresponds to the shape of segments a flowpath (e.g., bypass flowpath B or core flow path C of FIG. 1), as shown by the large dashed lines. The airfoil section 62 extends from a platform 69 (see also FIG. 1). In the case of an airfoil 61 with an integral platform, the 0% span position corresponds to the radially innermost location where the airfoil section 62 meets the fillet joining the airfoil section 62 to the platform 69. In the case of an airfoil 61 without an integral platform, the 0% span position corresponds to the radially innermost location where the discrete platform 69 meets the exterior surface of the airfoil section 62. A 100% span position corresponds to a section of the airfoil section 62 at the tip portion 66.

Figure 6:
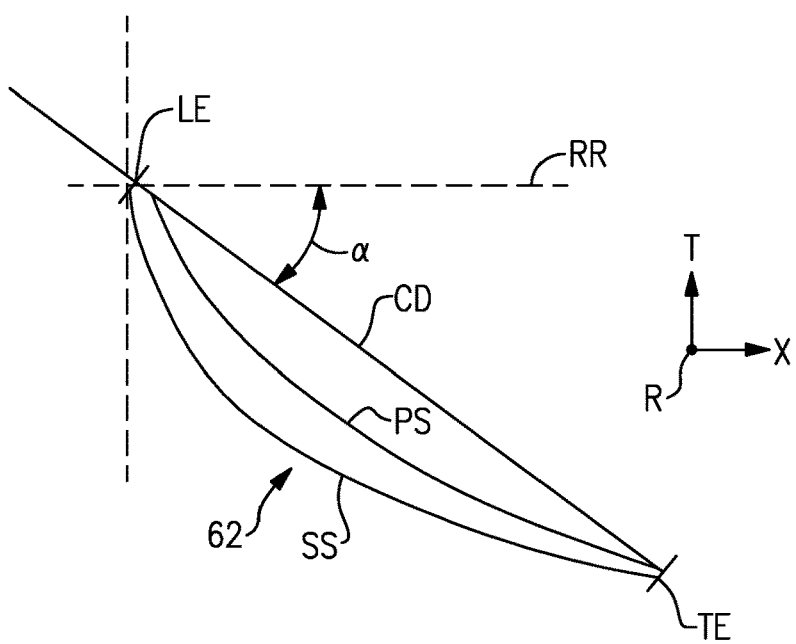
FIG. 6 is a schematic view of an airfoil section depicting a stagger angle at a span position of FIG. 5.

Referring to FIG. 6, with continuing reference to FIG. 5, the airfoil section 62 is sectioned at a radial position between the root section 64 and tip portion 66. In examples, each airfoil section 62 is specifically twisted about a spanwise axis in the radial direction R with a corresponding stagger angle α at each span position. Chord CD, which is a length between the leading and trailing edges LE, TE, forms stagger angle α relative to the chordwise direction X or a plane parallel to the axis or rotation RR. The stagger angle α can vary along the span of the airfoil section 62 to define a twist. For example, the tip portion 66 can define a stagger angle α relative to the root section 64 that is greater than or equal to 5 degrees or 10 degrees, absolute. In some examples, the stagger angle α at the tip portion 66 relative to the root section 64 is between 5-60 degrees, absolute, or more narrowly between 10-30 degrees, absolute, such that the airfoil section 62 is twisted about a spanwise axis as illustrated by the airfoil 61 of FIGS. 2 and 3. The airfoil section 62 can be three-dimensionally twisted about the spanwise axis.

Figure 7:
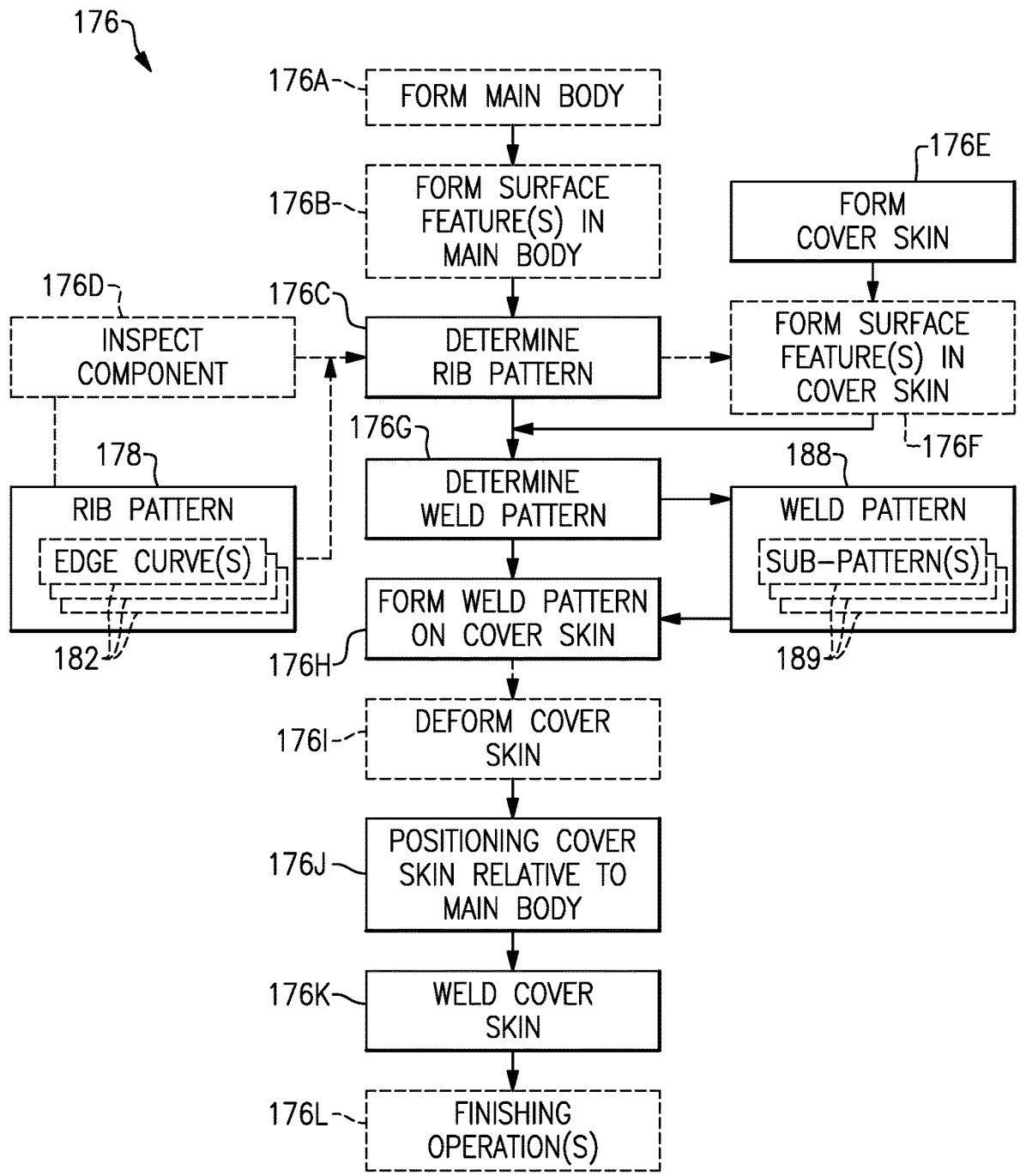
FIG. 7 illustrates a process for forming a gas turbine engine component.
Figure 8:
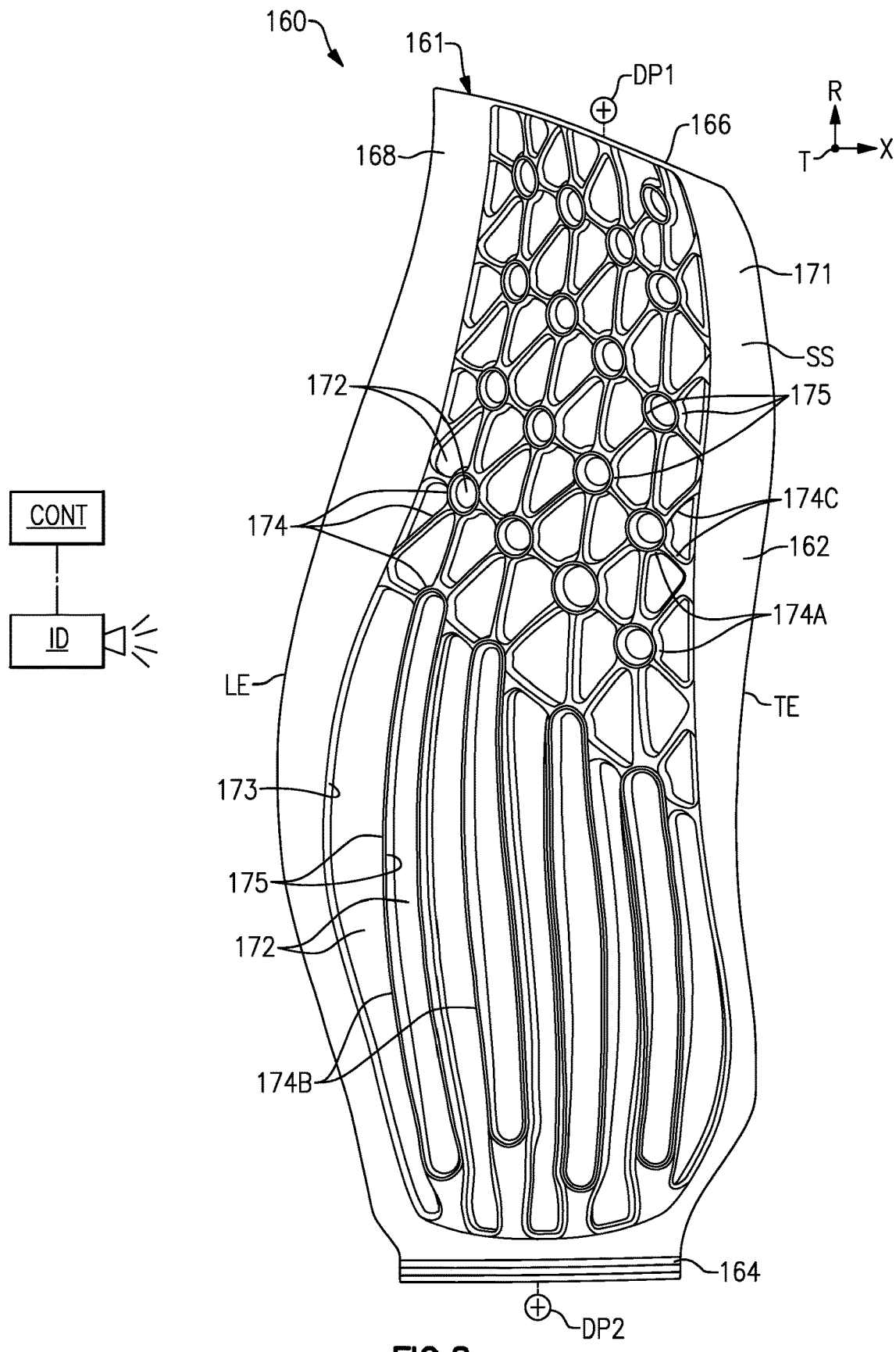
FIG. 8 illustrates a gas turbine engine component including surface features in a main body.
Figure 15:
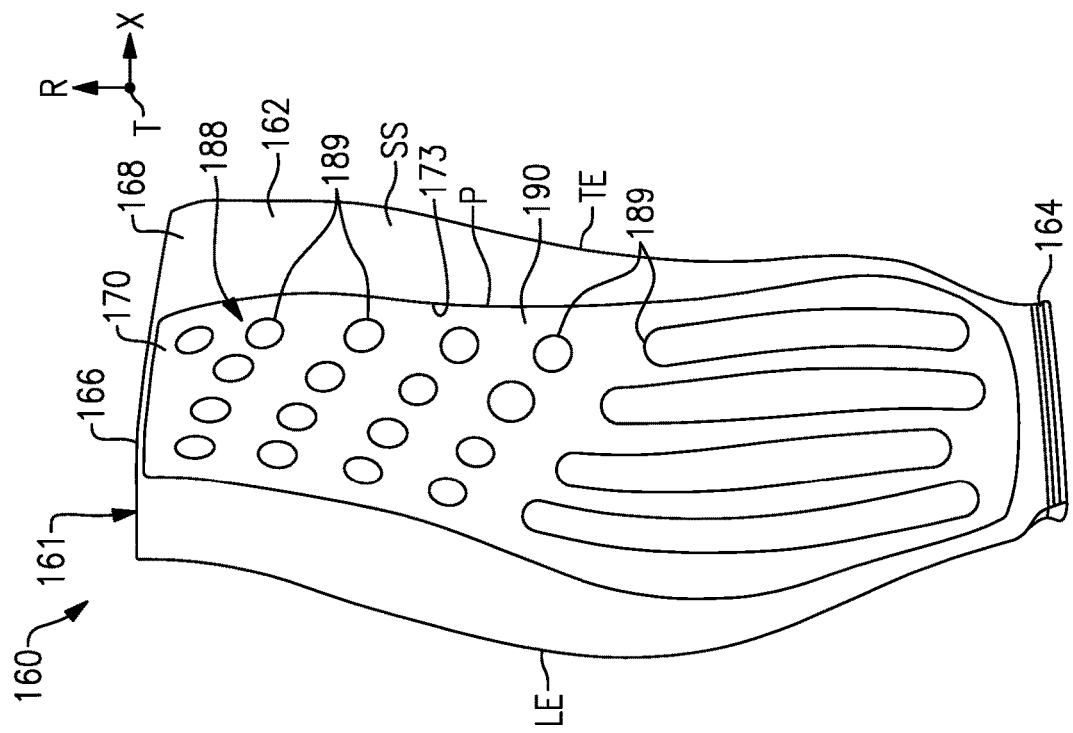
FIG. 15 illustrates a perspective view of the first skin attached to the main body of FIG. 13.

FIG. 7 illustrates a process of constructing or forming a gas turbine engine component in a flow chart 176. In this disclosure, like reference numerals designate like elements where appropriate and reference numerals with the addition of one-hundred or multiples thereof designate modified elements that are understood to incorporate the same features and benefits of the corresponding original elements. The process can be utilized to form the component 60 of FIGS. 2-3, including airfoil 61, fan blade 43, another hollow airfoil, a solid airfoil, or another component of the engine 20 such as a static vane or strut, for example. Reference is made to component 160 of FIGS. 8-15 for illustrative purposes, which disclose exemplary conditions or states of the component 160 in the process 176. In the illustrative example of FIGS. 8-15, the component 160 is an airfoil 161 including an airfoil section 162 having a main (or airfoil) body 168 and a cover (or first) skin 170. FIGS. 8 and 13-15 illustrate the main body 168. FIGS. 9-15 illustrate the cover skin 170 at various states of formation or assembly. FIG. 8 illustrates the main body 168 free of the cover skin 170. FIG. 15 illustrates a perspective view of the cover skin 170 attached to the main body 168. The techniques disclosed herein can be utilized to form a new component or to repair a previously fielded component.

Referring to FIGS. 7-8, one or more portions of the component 160 can be prepared or otherwise provided at steps 176A-176B (shown in dashed lines). At step 176A, the main body 168 is formed with respect to a predefined geometry, which can be defined with respect to one or more design criteria. Step 176A can include mounting the main body 168 to a tool and machining internal and/or external surfaces of the main body 168 with respect to the predefined blade geometry.

Figure 13:
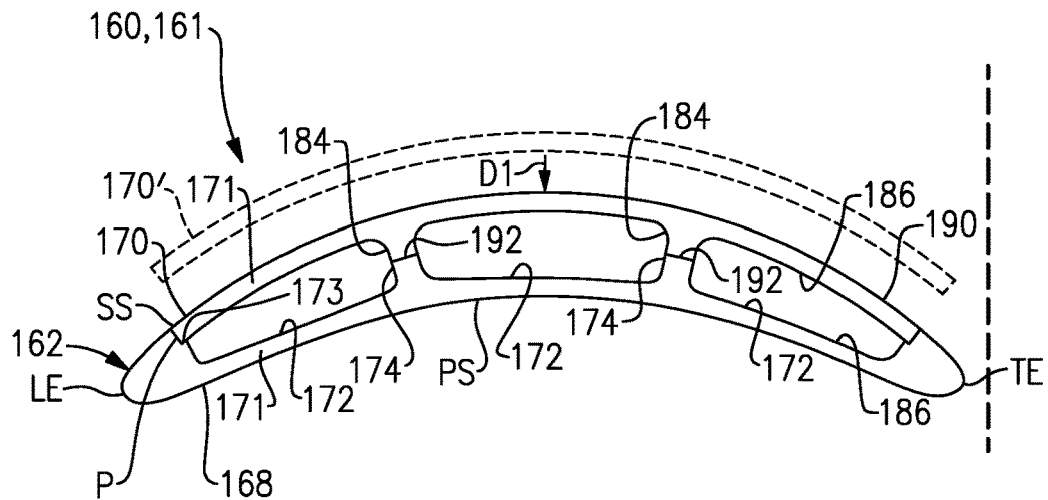
FIG. 13 illustrates the first skin of FIG. 11 positioned relative to the main body of FIG. 8.

At step 176B, one or more surface features are formed or otherwise defined in the main body 168. In the illustrated example of FIGS. 7-8, the surface features include one or more internal channels 172 that are formed in the main body 168 between one or more internal ribs 174. Internal ribs 174 can include ribs 174A, 174B, 174C distributed along the main body 168. It should be appreciated that each internal channel 172 and internal rib 174 can have different dimensions, shapes and/or orientations than illustrated by FIG. 8. The surface features can include a shelf or recess 173 that is formed or otherwise defined in the main body 168. The recess 173 is dimensioned to at least partially receive and mate with a perimeter of the cover skin 170, as illustrated by FIGS. 13 and 15. The main body 168 and surfaces features including internal ribs 174 can be forged, cast, machined or produced by additive manufacturing from a metal or metal alloy, for example.

Referring to FIGS. 7 and 9, with continuing reference to FIG. 8, a rib pattern 178 of the component 160 is determined at step 176C. The rib pattern 178 corresponds to a geometry of the internal ribs 174 (a profile of the recess 173 is shown in dashed lines for illustrative purposes). The rib pattern 178 is defined with respect to one or more common datums (e.g., datums DP1, DP2 in FIGS. 8-9). Each datum DP1, DP2 can be an aperture defined in the component 160, for example. The datums are common between the main body 168 and the cover skin 170.

Step 176C can include inspecting one or more portions of the component 160 at step 176D. The cover skin 170 can have a substantially planar geometry during steps 176C and/or 176D. Step 176D includes inspecting the surface features of the main body 168 including the internal ribs 174 to determine the rib pattern 178, which occurs subsequent to step 176B.

Various techniques can be utilized to inspect the component 160, including contact and/or non-contact visual inspection techniques. Non-contacting inspection techniques include laser and structural light inspection. For example, inspection device ID can be positioned relative to the main body 168 to inspect the component 160, as illustrated in FIG. 8. The inspection device ID can be a non-contacting device coupled to a control CONT (FIG. 8). The control CONT can be programmed with logic to determine a geometry of the component 160 including the rib pattern 178 based on coordinate data and other information communicated by the inspection device ID. Example logic can include edge detection and other image recognition techniques. The control CONT can include a processor and memory to store coordinate data and other information relating to the component 160. The control CONT can be operable to reference the common datum(s), including datum points DP1, DP2, to determine a relative location of the coordinate data relating to the surface features of the component 160.

Step 176D can include determining a set of edge curves 182 (FIG. 7) corresponding to a geometry of sidewalls 175 (FIG. 8) of the internal ribs 174, with a geometry of the rib pattern 178 corresponding to the set of edge curves 182. The edge curves 182 can be extracted from the inspection data provided by the inspection device ID (FIG. 8). The rib pattern 178 can include one or more sub-patterns 180 (FIG. 9) corresponding to a respective one of the internal ribs 174. Each sub-pattern 180 can be defined by one or more of the edge curves 182 such that the rib pattern 178 has substantially the same geometry as a geometry of the internal ribs 174 that abut against the cover skin 170 in an installed position. The edge curves 182 can be unwrapped from a curved state of the main body 168 to a flat state using the common datums as a reference.

Referring to FIGS. 7 and 10, at step 176E the cover skin 170 is formed with respect to a predefined geometry, which can be defined with respect to one or more design criteria. The cover skin 170 can be forged, cast, or produced by additive manufacturing from a metal or metal alloy, for example. In the illustrative example of FIG. 10, the cover skin 170 is formed from a sheet metal body having a substantially planar geometry. A perimeter P of the cover skin 170 can be dimensioned to mate with a geometry of the recess 173 (FIG. 8) of the main body 168.

Figure 11:
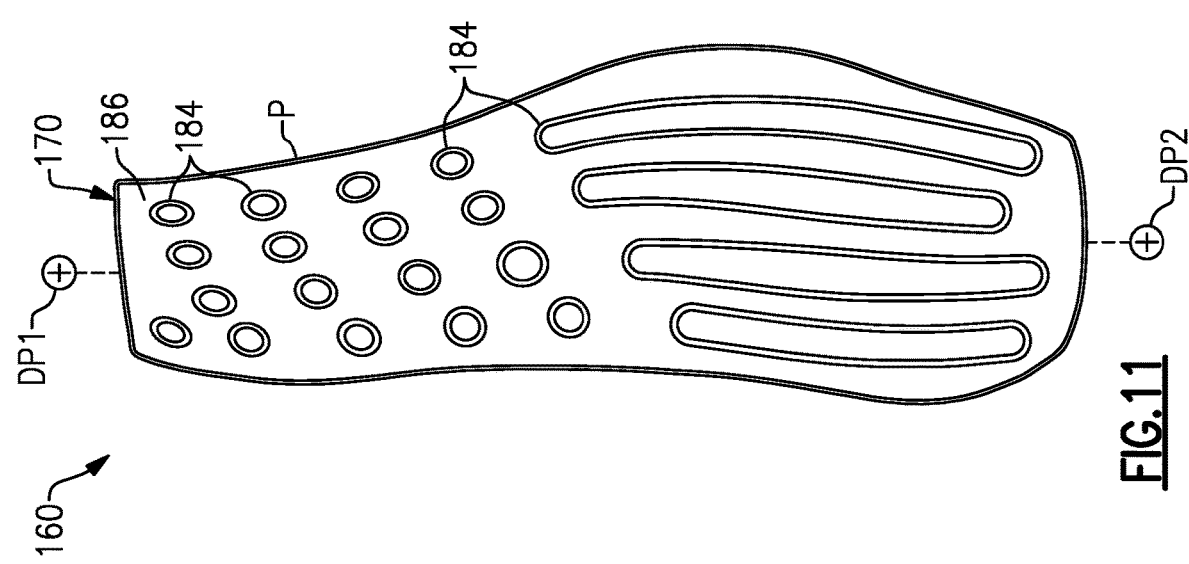
FIG. 11 illustrates the first skin of FIG. 10 in a second condition.

One or more internal surface features can be formed in an internal surface 186 of the cover skin 170 at step 176F. In the illustrative example of FIG. 10, the surface features include one or more pedestals 184. The pedestals 184 can be formed in the internal surface 186 of the cover skin 170 according to the rib pattern 178 to reduce a likelihood of misalignment in an assembled position. The pedestals 184 can be dimensioned to have a geometry that substantially or identically mirrors a geometry of the internal ribs 174 corresponding to the rib pattern 178, as illustrated by FIGS. 9 and 10. For the purposes of this disclosure, the term "substantially" means±3 percent of the respective value unless otherwise stated. In other examples, the pedestals 184 are omitted. The pedestals 184 are dimensioned to directly abut against respective ones of the internal ribs 174 along an interface 192 when in an installed position, as illustrated by FIG. 13. The perimeter P of the cover skin 170 can be milled or otherwise machined with respect to the predefined geometry, as illustrated by FIG. 11. The cover skin 170 can have a substantially planar geometry during formation of the pedestals 184 and machining of the perimeter P of the cover skin 170, which can reduce manufacturing complexity. Machining paths of the pedestals 184 and perimeter P of the cover skin 170 can be derived from the edge curves 182 determined at step 176D.

Attachment of the internal ribs 174 to the cover skin 170 can occur subsequent to positioning of the cover skin 170 against the main body 168, which may preclude or otherwise limit the ability to visually confirm a location of the internal ribs 174 during attachment of the cover skin 170. During a blind weld scenario, a position of the internal surface features may be known with respect to design artifacts, such as design drawings or requirements, but the position of the internal surfaces features may not be known with a high level of confidence or precision, due to tolerances for instance. Process 176 includes mechanically attaching the cover skin 170 to the internal ribs 174 utilizing a blind weld or attachment technique.

At step 176G, a weld pattern 188 corresponding to the component 160 is determined. The weld pattern 188 can be determined or otherwise defined by the control CONT (FIG. 8). An example weld pattern 188 is illustrated by FIG. 12. The weld pattern 188 is based on the surface features of the component 160 including at least a geometry of the internal ribs 174. The weld pattern 188 can be based on the rib pattern 178 that is determined or defined at steps 176C, 176D. In examples, the weld pattern 188 corresponds to, is otherwise based on, at least a portion of the rib pattern 178 and/or a geometry of the recess 173. The weld pattern 188 can correspond to the set of edge curves 182 determined at step 176D. The rib pattern 178 and weld pattern 188 can correspond to respective sets of data coordinates that are defined with respect to the common datum(s), including datum points DP1, DP2. The component 160 is inspected according to the common datums.

The data coordinates can be stored in a memory device and accessed by a computing device that is operable to execute the process 176, such as the control CONT (FIG. 8), for example. The weld pattern 188 includes a plurality of separate and distinct sub-patterns 189. Each of the sub-patterns 189 corresponds to a geometry of a respective one of the surface features including the internal ribs 174.

In examples, the weld pattern 188 is offset from at least a portion of the rib pattern 178. For example, each sub-pattern 189 can correspond to a respective mean line defined between opposing sidewalls 175 of a respective one of the internal ribs 174, as illustrated in FIG. 12A (with sidewalls 175 shown in dashed lines for illustrative purposes). Each mean line can be established or otherwise defined relative to a respective pair of edge curves 182 determined at step 176D. As illustrated by FIG. 12A, each internal rib 174 can have a first arcuate portion 174-1 and a second arcuate portion 174-2 opposed to the first arcuate portion 174-1 such that a respective one of the internal ribs 174 encircles a respective one of the internal channels 172. In other examples, the weld pattern 188 is a geometry of the rib pattern 178.

Referring to FIGS. 7 and 12, the weld pattern 188 is formed in an external surface 190 of the cover skin 170 at step 176H. Various techniques can be utilized to form the weld pattern 188 along surfaces of the component 160, including laser etching or marking, or another machining technique. The cover skin 170 can be mounted to a machining tool in a flat state according to the common datums (e.g., datum points DP1, DP2). The etched weld pattern 188 serves as a weld path for attaching the cover skin 170 to the main body 168.

In examples, the cover skin 170 can be permanently deformed or reshaped with respect to a predefined contour or cover geometry to establish a curved state at step 176I, which can occur subsequent to forming the weld pattern 188 and/or surface features including pedestals 184 in the cover skin 170 at steps 176F, 176H. Deforming or reshaping the cover skin 170 can include hot forming the cover skin 170 with respect to the predefined cover geometry. A forming tool including one or more dies can be utilized to hot form the cover skin 170, which can be performed in a vacuum environment. The cover skin 170 can be mounted in the forming tool according to the common datums. The perimeter P of the cover skin 170 can be machined to the predefined cover geometry.

The cover skin 170 can have a substantially planar geometry during formation of the weld pattern 188 at step 176H and prior to deforming the cover skin at step 176I. Deformation of the cover skin 170 can performed with respect to a predefined contour of the airfoil 161. For example, a tip portion 166 of the airfoil 161 can define a stagger angle relative to a root section 164 such that the airfoil 161 is twisted to define the predefined contour, as illustrated by FIG. 8 (see also airfoil 61 of FIG. 3 and stagger angle α of FIG. 6). The stagger angle of the airfoil 161 can include any of the values disclosed herein. The cover skin 170 can be deformed according to the predefined contour of the airfoil 161.

Figure 14:
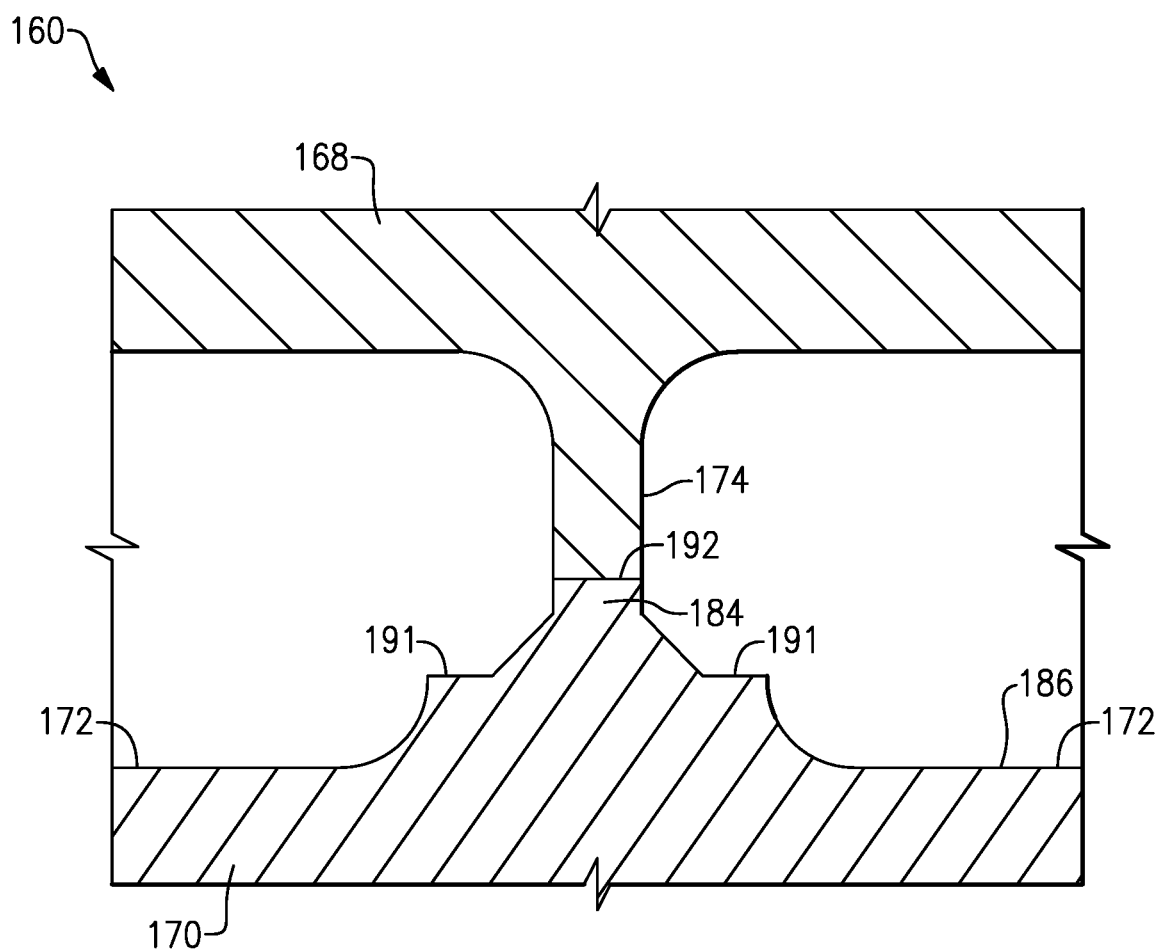
FIG. 14 illustrates selected portions of the first skin attached to the main body of FIG. 13.

Referring to FIGS. 7 and 13-14, the cover skin 170 is positioned relative to, and along, the main body 168 to enclose the internal channels 172 at step 176J. The main body 168 can be mounted in a welding fixture. The cover skin 170 is positioned relative to the main body 168 and held against the main body 168 such that the pedestals 184 directly abut against respective internal ribs 174 along the interfaces 192. Three internal ribs 174 and three pedestals 184 are shown in FIG. 13 for illustrative purposes. Cover skin 170' is shown in dashed lines in FIG. 13 at a distance away from the main body 168 for illustrative purposes. Positioning can include moving cover skin 170' in a direction D1 and into abutment with the internal ribs 174 to define a pre-finished state of the airfoil section 162, as illustrated by the cover skin 170. In other examples, the pedestals 184 are omitted and the internal surface 186 of the cover skin 170 directly abuts against the internal ribs 174. A surface profile of the cover skin 170 when positioned against the main body 168 can be optically inspected and compared to the rib pattern 178 and related edge curves 182 to verify that a geometry of the cover skin 170 meets design criteria.

Once the cover skin 170 is positioned relative to the main body 168 at step 176J, the cover skin 170 is welded or otherwise mechanically attached to the main body 168 at step 176K. A welding tool can be utilized to weld the cover skin 170 by following a weld path. Surfaces of the pedestals 184 of the cover skin 170 can be welded to respective surfaces of the internal ribs 174 along the weld path defined by the weld pattern 188 to establish a weldment, as illustrated by FIG. 15. Welding along the weld path can establish one or more chamfers or buttresses 191 extending outwardly from the respective pedestal 184, as illustrated by FIG. 14. Improved alignment of the internal ribs 174 and pedestals 184 can cause outermost portions of the buttresses 191 to be defined relatively closer to the weldment. The perimeter P of the cover skin 170 can be welded to surfaces of recess 173 of the main body 168 along the weld pattern 188. Example welding techniques can include laser or electron beam welding.

One or more finishing operations can be performed at step 176L, including machining external surfaces of the component 160 including removing the weld pattern 188 defined in the external surface 190 of the cover skin 170.

The process disclosed herein can be utilized to more accurately attach portions of a component to internal surface features of the component, including facing surfaces features of the component during a blind weld technique. More accurately attaching and aligning portions of the component can improve quality and durability. Improved alignment of the surface features including internal ribs 74/174 to the pedestals 184 or another portion of the cover skin 70/170, can reduce stress concentrations in the component 60/160, such as rotating airfoils. The techniques disclosed herein can facilitate inspection and closed-loop verification of weld paths, and utilization of adaptive machining techniques including tailoring a geometry of one or more surface features in the cover skin 170 relative to an as-produced instance of the main body 168 based on the inspection data and associated rib and weld patterns 178, 188 of the corresponding component 160. Utilization of a 3-axis machine to form the surface features of the cover skin 70/170 can be utilized, rather than a 5-axis machine, for example, which can reduce complexity and time to fabricate the component 60/160.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of forming a gas turbine engine component comprising:
   forming a plurality of internal channels in a main body between one or more internal ribs;
   forming a weld pattern in an external surface of a cover skin, the weld pattern based on at least a geometry of the one or more internal ribs;
   positioning the cover skin along the main body to enclose the plurality of internal channels, wherein the positioning step occurs subsequent to the step of forming the weld pattern; and
   welding the cover skin to the main body along the weld pattern subsequent to the positioning step.

2. The method as recited in claim 1, wherein the one or more internal ribs are a plurality of internal ribs that are spaced apart along a wall of the main body.

3. The method as recited in claim 2, wherein the weld pattern comprises a plurality of separate and distinct sub-patterns, each of the sub-patterns corresponding to a respective one of the plurality of internal ribs.

4. The method as recited in claim 3, wherein each sub-pattern corresponds to a mean line defined between opposing sidewalls of a respective one of the plurality of internal ribs.

5. The method as recited in claim 3, wherein each of the internal ribs has a first arcuate portion and a second arcuate portion opposed to the first arcuate portion such that the respective one of the internal ribs encircles a respective one of the plurality of internal channels.

6. The method as recited in claim 1, wherein the main body and the external surface of the cover skin cooperate to define pressure and suction sides of an airfoil.

7. The method as recited in claim 6, wherein the airfoil is a fan blade.

8. The method as recited in claim 1, further comprising inspecting the one or more internal ribs to define the weld pattern.

9. The method as recited in claim 8, wherein the inspecting step includes determining a set of edge curves corresponding to the geometry of the one or more internal ribs, and the weld pattern corresponds to the set of edge curves.

10. The method as recited in claim 1, wherein the cover skin and the main body are metallic.

11. The method as recited in claim 1, further comprising:
    forming a recess in the main body that extends about the one or more internal ribs and that is dimensioned to mate with a perimeter of the cover skin;
    wherein the weld pattern is based on a geometry of the recess; and
    wherein the welding step includes welding the perimeter of the cover skin to surfaces of the recess along the weld pattern.

12. The method as recited in claim 1, further comprising:
    forming one or more pedestals in an internal surface of the cover skin;
    positioning the one or more pedestals in abutment against respective ones of the one or more internal ribs; and
    wherein the welding step includes welding the one or more internal ribs to respective ones of the one or more pedestals along the weld pattern.

13. The method as recited in claim 1, further comprising:
    deforming the cover skin with respect to a predefined contour subsequent to the step of forming the weld pattern; and
    wherein the main body extends from a root section to a tip portion, and the step of deforming the cover skin occurs such that the tip portion defines a stagger angle relative to the root section, and the stagger angle is greater than or equal to 10 degrees, absolute.

14. A method of forming a gas turbine engine component comprising:
    forming a plurality of internal channels in a main body between a plurality of internal ribs;
    inspecting the main body to determine a rib pattern subsequent to forming the plurality of internal channels, the rib pattern corresponding to a geometry of the plurality of internal ribs;

forming a plurality of pedestals in an internal surface of a cover skin according to the rib pattern;

forming a weld pattern in an external surface of the cover skin, the weld pattern based on at least a geometry of the plurality of internal ribs;

positioning the cover skin along the main body to enclose the plurality of internal channels such that the plurality of pedestals abut against respective ones of the plurality of internal ribs, wherein the positioning step occurs subsequent to the step of forming the weld pattern; and welding the plurality of pedestals to respective ones of the plurality of internal ribs subsequent to the positioning step.

15. The method as recited in claim 14, further comprising:
welding the cover skin to the main body along the weld pattern subsequent to the positioning step.

16. The method as recited in claim 15, wherein the weld pattern is offset from the rib pattern.

17. The method as recited in claim 15, further comprising:
deforming the cover skin with respect to a predefined contour subsequent to the step of forming the plurality of pedestals, wherein the cover skin has a substantially planar geometry during the inspecting step;

forming a recess in the main body that is dimensioned to mate with a perimeter of the cover skin;

wherein the cover skin has a substantially planar geometry during the step of forming the plurality of pedestals; and wherein the welding step includes welding a perimeter of the cover skin to the main body along the weld pattern subsequent to the positioning step.

18. The method as recited in claim 14, wherein the cover skin and the main body are metallic.

19. The method as recited in claim 14, wherein the inspecting step includes determining a set of edge curves corresponding to sidewalls of the plurality of internal ribs, and the rib pattern corresponds to the set of edge curves.

20. A method of forming a gas turbine engine component comprising:

forming a plurality of internal channels in a main body between one or more internal ribs;

forming a weld pattern in an external surface of a cover skin, the weld pattern based on at least a geometry of the one or more internal ribs;

positioning the cover skin along the main body to enclose the plurality of internal channels;

welding the cover skin to the main body along the weld pattern subsequent to the positioning step; and deforming the cover skin with respect to a predefined contour subsequent to the step of forming the weld pattern, and wherein the cover skin has a substantially planar geometry during the step of forming the weld pattern.

21. The method as recited in claim 20, wherein the main body extends from a root section to a tip portion, and the step of deforming the cover skin occurs such that the tip portion defines a stagger angle relative to the root section, and the stagger angle is greater than or equal to 10 degrees, absolute.

* * * * *